W. R. HOLDER.
HARROW.
APPLICATION FILED OCT. 21, 1920.

1,431,229.

Patented Oct. 10, 1922.

Inventor
W. R. Holder.
By C. A. Snow & Co.
Attorneys

Patented Oct. 10, 1922.

1,431,229

UNITED STATES PATENT OFFICE.

WILLIAM R. HOLDER, OF LODGE, TENNESSEE.

HARROW.

Application filed October 21, 1920. Serial No. 418,494.

*To all whom it may concern:*

Be it known that I, WILLIAM R. HOLDER, a citizen of the United States, residing at Lodge, in the county of Marion and State of Tennessee, have invented a new and useful Harrow, of which the following is a specification.

This invention relates to harrows, one of its objects being to provide a harrow which can be readily varied in width so as to cultivate all portions of the soil between the rows, the teeth of the harrow being so located that no two teeth will travel in the same path, and so that the last teeth to pass between two rows travel nearest the middle of the space between the rows thereby permitting the operator to readily see the positions of the outermost teeth relative to the rows of plants.

Another object is to provide a harrow which is simple, durable and compact and can be controlled readily at all times.

With the foregoing and other objects in view which will appear as the description proceeds, the invention consists of certain novel details of construction and combinations of parts which will be hereinafter more fully described and pointed out in the claim it being understood that various changes may be made in the construction and arrangement of the parts without departing from the spirit or sacrificing any of the advantages of the invention as set forth in the appended claim.

In the accompanying drawings the preferred form of the invention has been shown.

In said drawings—

Figure 1:
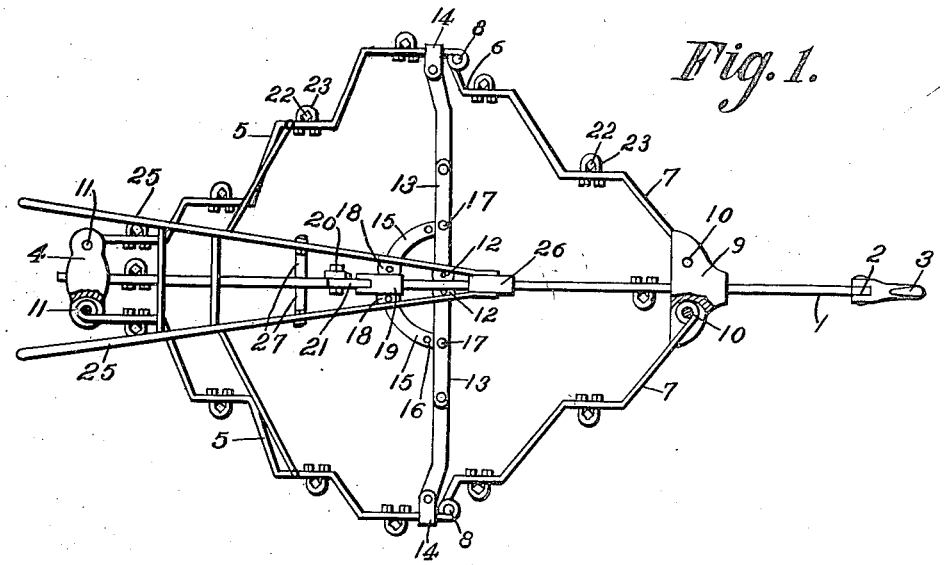
Figure 1 is a plan view of the harrow.
Figure 2:
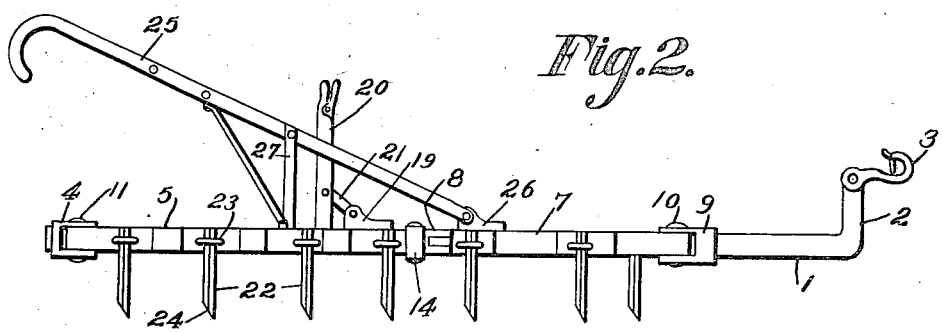
Figure 2 is a side elevation thereof.

Referring to the figures by characters of reference, 1 designates a longitudinal beam the front end of which is preferably upturned, as at 2 and has a clevis 3 attached thereto. To the rear end is secured a block 4 in the sides of which are pivotally mounted the rear ends of the rear side members of the harrow. These members, which have been shown at 5 are stepped forwardly and outwardly. To the front ends of the portions 5 are hingedly connected the rear end portions 6 of the forward side members of the harrow, these members being indicated at 7 and their hinge connections at 8. The members 7 are stepped inwardly and forwardly and are hingedly connected, at their front ends to a block 9 slidable on the beam 1. The hinge connections between the members 7 and the block 9 have been indicated at 10 and the hinge connections between the members 5 and the block 4 have been indicated at 11.

Ears 12 are extended laterally from the beam 1 and the inner ends of toggles 13 are pivotally connected thereto while the outer ends of the toggles are pivotally attached to brackets 14 secured to the members 5 near their points of connection with the members 7. Connecting links 15 are adjustably attached to the toggles near the middle joints thereof by means of pivots extending through selected openings 16, said pivots being shown at 17 and the openings 16 being arranged in series in the links 15. The links are pivotally connected to ears 18 extending laterally from a slide 19 mounted on the beam 1. A lever 20 is pivotally connected to the beam 1 and has a link 21 extending therefrom and connected to the slide 19. Any suitable means may be provided for holding the lever in any position to which it may be adjusted and it will be apparent that, by shifting the lever, the links 15 can be operated to shift the toggles 13 and thereby move the sliding block 9 along the beam 1. When said block is moved in one direction the side members of the harrow will be drawn toward each other and, when it is moved in the opposite direction the said members will be moved apart. Thus the width of the path of the harrow can be controlled readily so as to insure cultivation close up to the plants in the rows.

The teeth 22 of the harrow are attached to the longitudinal portions of the offsets or steps in the side members 5 and 7, these teeth being fastened by U-bolts 23 or the like. The lower ends of the teeth are preferably beveled downwardly and forwardly, as at 24, each tooth being formed of a rectangular strip or bar with its faces disposed obliquely to the path of travel.

Handles 25 are secured to a block 26 fastened on the beam 1 and braces 27 connect the handles to the beam.

It will be noted that the steps in the side members are of different sizes so that no two teeth will travel in the same path. It will also be noted that the teeth at the back of the harrow are far removed from the rows during cultivation and the operator can readily see the outermost teeth at the centers of the sides of the harrow and determine when they require adjustment from or toward the rows.

It will be noted that the structure is very compact and durable and by arranging the teeth in irregular stepped relation with the outermost teeth nearest the centers of the sides of the harrow, the ground is thoroughly pulverized and the proper positioning of the harrow relative to the rows can be gauged at all times.

What is claimed is:—

A harrow including a central beam, a block fixedly secured to the rear end portion of the beam, a block slidably mounted on the front end portion of the beam, a pair of side members at each side of the beam, the members of each pair being pivotally connected, and one member of each pair being hingedly attached to the rear block and the other member of each pair being hingedly attached to the movable block, oppositely extending toggles between the blocks, the inner ends of the toggles being hingedly connected to opposed faces respectively of the beam and the outer ends of the toggles being hingedly connected to the respective pairs of side members at points close to the point of connection between the members of each pair, a slide upon the beam, arcuate link connections between the slide and the respective toggles, a hand lever mounted on the beam and connected to the slide, and nonaligning soil engaging devices connected to the respective side members.

In testimony that I claim the foregoing as my own, I have hereto affixed my signature in the presence of two witnesses.

WILLIAM R. HOLDER.

Witnesses:
 LEM RAULSTON,
 J. E. PAYNE.